(12) United States Patent
Matsushita et al.

(10) Patent No.: US 10,969,533 B2
(45) Date of Patent: Apr. 6, 2021

(54) VEHICULAR LAMP FITTING

(71) Applicant: STANLEY ELECTRIC CO., LTD., Tokyo (JP)

(72) Inventors: Kazuteru Matsushita, Tokyo (JP); Yuki Takamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/662,283

(22) Filed: Oct. 24, 2019

(65) Prior Publication Data

US 2020/0132910 A1 Apr. 30, 2020

(30) Foreign Application Priority Data

Oct. 24, 2018 (JP) .............................. JP2018-199975

(51) Int. Cl.
  *F21V 8/00* (2006.01)
  *F21S 41/24* (2018.01)
  *F21S 43/40* (2018.01)
  *F21S 41/14* (2018.01)

(52) U.S. Cl.
  CPC ............ *G02B 6/0045* (2013.01); *F21S 41/14* (2018.01); *F21S 41/24* (2018.01); *F21S 43/40* (2018.01)

(58) Field of Classification Search
  CPC ..................................................... F21S 41/24
  See application file for complete search history.

(56) References Cited

U.S. PATENT DOCUMENTS

| | | | |
|---|---|---|---|
| 5,835,661 A | 11/1998 | Tai et al. | |
| 9,242,594 B2 * | 1/2016 | Nakada | F21S 43/249 |
| 9,340,149 B2 * | 5/2016 | Domini | B60Q 1/30 |
| 2014/0160778 A1 | 6/2014 | Nakada | |
| 2014/0211493 A1 * | 7/2014 | Ichikawa | G02B 6/0001 |
| | | | 362/511 |
| 2016/0312973 A1 | 10/2016 | Brosinger et al. | |
| 2017/0059106 A1 | 3/2017 | Sato | |
| 2017/0234501 A1 | 8/2017 | Hanami et al. | |

(Continued)

FOREIGN PATENT DOCUMENTS

| | | |
|---|---|---|
| DE | 10 2004 054 732 A1 | 5/2006 |
| EP | 1 154 198 A2 | 11/2001 |

(Continued)

OTHER PUBLICATIONS

The extended European Search Report for the related European Patent Application No. 19204742.1 dated Mar. 27, 2020.

*Primary Examiner* — Matthew J. Peerce

(74) *Attorney, Agent, or Firm* — Kenealy Vaidya LLP

(57) ABSTRACT

A vehicular lamp fitting, comprising: a lamp case having an opening edge; a light guide that is disposed in the lamp case; and a light source that emits light which is guided inside the light guide, wherein the light guide includes a bar light-guiding unit and a plate light-guiding unit, the bar light-guiding unit includes a front face disposed on the front side and a rear face disposed on the rear side, the plate light-guiding unit includes a front face disposed on the front side and a rear face disposed on the rear side, and includes one edge connected to an outer peripheral surface of the bar light-guiding unit, and the other edge which is on the opposite side of the one edge, the other edge of the plate light-guiding unit extends along the opening edge in the front view.

9 Claims, 15 Drawing Sheets

(56) References Cited

U.S. PATENT DOCUMENTS

2018/0186282 A1 7/2018 Gahimer et al.
2018/0195682 A1 7/2018 Fisher et al.

FOREIGN PATENT DOCUMENTS

| JP | 2012-248358 A | 12/2012 |
| JP | 2014-116142 A | 6/2014 |
| JP | 2017-041368 A | 2/2017 |
| JP | 2017-045522 A | 3/2017 |
| JP | 2017-195134 A | 10/2017 |
| WO | 2015/090535 A1 | 6/2015 |

* cited by examiner

VEHICULAR LAMP FITTING

CROSS-REFERENCE TO RELATED APPLICATION

This application is based upon and claims the benefit of priority of the prior Japanese Patent Application No. 2018-199975, filed on Oct. 24, 2018, the entire contents of which are incorporated herein by reference.

FIELD

The present invention relates to a vehicular lamp fitting, and more particularly to a vehicular lamp fitting which prevents nonuniformity of the space between an outer peripheral edge of a light guide and an opening edge of a lamp case (particularly an irregular-shaped opening edge including a curved portion), and allows a bar light-guiding unit and a plate light-guiding unit to emit light uniformly (or approximately uniformly).

BACKGROUND

FIG. 13 is a front view of a conventional light guide which includes a bar light-guiding unit and a plate light-guiding unit. FIG. 14 and FIG. 15 are front views of a lamp case 130 which includes an irregular-shaped opening edge 132 (e.g. T-shaped opening edge) in which the light guide illustrated in FIG. 13 is disposed.

As illustrated in FIG. 13, a vehicular lamp fitting including a light guide 100 which has two bar light-guiding units 110A and 110B, which are disposed in parallel with a space, and a plate light-guiding unit 120 which connects the side faces (outer peripheral surfaces) of the two bar light-guiding units 110A and 110B facing each other has been proposed (e.g. see Japanese Patent Application Publication No. 2014-116142 (FIG. 1, FIG. 2)).

In the vehicular lamp fitting according to Japanese Patent Application Publication No. 2014-116142, light from a light source (not illustrated), which entered the light guide 100 via one edge portion 111A or 111B of each of the bar light-guiding units 110A and 110B, is guided inside the light guide 100, and is emitted from a front face 112A or 112B (front face of outer peripheral surface) of each of the bar light-guiding units 110A and 110B and a front face 121 of the plate light-guiding unit 120. Thereby each bar light-guiding unit 110A and 110B and the plate light-guiding unit 120 emit light.

The present inventors considered disposing the light guide 100 of Japanese Patent Application Publication No. 2014-116142 in a lamp case 130 as illustrated in FIG. 14, where the rear face side is closed by the bottom part 131, and the front face side has an irregular-shaped (e.g. T-shaped) opening edge 132 including a curved portion 132a, so as to implement a vehicular lamp fitting having a new appearance.

SUMMARY

However in the case of disposing the light guide 100 in the lamp case 130 having an irregular shaped (e.g. T-shaped) opening edge 132 including the curved portion 132a, the space between the outer peripheral edges (each bar light-guiding unit 110A, 110б) of the light guide 100 and the opening edge 132 of the lamp case 130 becomes nonuniform (space L1≠space L2 in FIG. 14) in the front view, which diminishes appearance.

A possible solution to this problem is to extend the bar light-guiding units 110A and 110б along the opening edge 132 of the lamp case 130, as illustrated in FIG. 15, so that the space between the outer peripheral edge (each bar light-guiding unit 110A, 110б) of the light guide 100 and the opening edge 132 of the lamp case 130 (e.g. see space indicated by L3 in FIG. 15) becomes uniform (or approximately uniform).

In this case, however, each of the bar light-guiding units 110A and 110б becomes a shape which is curved along the opening edge 132 of the lamp case 130, which makes it difficult for each the bar light-guiding units 110A and 110б and the plate light-guiding unit 120 to emit light uniformly or approximately uniformly.

With the foregoing in view, it is an object of the present invention to provide a vehicular lamp fitting which prevents nonuniformity of the space between the outer peripheral edge of the light guide and the opening edge of the lamp case (particularly the irregular-shaped opening edge including a curved portion), and allows the bar light-guiding unit and the plate light-guiding unit to emit light uniformly (or approximately uniformly).

In order to achieve the object described above, an aspect of the present invention provides a vehicular lamp fitting, comprising: a lamp case having an opening edge; a light guide that is disposed in the lamp case; and a light source that emits light which is guided inside the light guide, wherein the light guide includes a bar light-guiding unit and a plate light-guiding unit, the bar light-guiding unit is a bar-shaped light-guiding unit that includes a front face disposed on the front side and a rear face disposed on the rear side, which is on the opposite side of the front side, the plate light-guiding unit is a plate-shaped light-guiding unit that includes a front face disposed on the front side and a rear face disposed on the rear side, which is on the opposite side of the front side, and includes one edge connected to an outer peripheral surface of the bar light-guiding unit, and the other edge which is on the opposite side of the one edge, the other edge of the plate light-guiding unit extends along the opening edge in the front view, the rear face of the bar light-guiding unit includes a plurality of first structures configured to diffuse the light from the light source, which is guided inside the light guide, and allow the light to emit through the front face of the bar light-guiding unit, and the rear face of the plate light-guiding unit includes a plurality of second structures configured to diffuse the light from the light source, which is guided inside the light guide, and allow the light to emit through the front face of the plate light-guiding unit.

According to this aspect, a vehicular lamp fitting, which prevents nonuniformity of the space between the outer peripheral edge of the light guide and the opening edge of the lamp case (particularly the irregular-shaped opening edge including a curved portion), and allows the bar light-guiding unit and the plate light-guiding unit to emit light uniformly (or approximately uniformly), can be provided.

This is because the outer peripheral edge of the light guide is not the bar light-guiding unit, but the other edge of the plate light-guiding unit, and this other edge of the plate light-guiding unit extends along the opening edge of the lamp case.

In this invention, it is preferable that the front face of the bar light-guiding unit is a curved surface of which cross-sectional shape, when sectioned by a plane that is orthogonal to the longer direction of the bar light-guiding unit, is arc-shaped which is convex toward the front side. The rear face of the bar light-guiding unit includes a pair of side faces, of which the cross-sectional shape, when sectioned by a plane that is orthogonal to the longer direction of the bar light-guiding unit, is a pair of arcs, which are convex toward the inside of the bar light-guiding unit and of which space decreases as approaching the rear side, and a hindmost face that connects the pair of side faces, so that the cross-sectional shape, when sectioned by a plane that is orthogonal to the longer direction of the bar light-guiding unit, becomes a line connecting the edges of the pair of arcs. The hindmost face includes the first structure.

According to this aspect, the bar light-guiding unit can emit light more brightly compared with the case of using a standard bar light-guiding unit of which cross-sectional shape is circular.

It is preferable that this invention further includes a reflection surface, and the reflection surface is disposed on the rear side of the light guide so as to face the rear face of the light guide.

According to this aspect, the reflection surface, which emits light by reflecting the light that is leaked backward from the light guide, is visually recognized behind the light guide that performs surface light emission (plane light-guiding unit) and linear light emission (bar light-guiding unit), hence a three-dimensional light-emitting appearance with a sense of depth can be implemented.

In this invention, it is preferable that the reflection surface is disposed on the bottom portion of the lamp case.

In the present invention, it is preferable that the light guide includes a first bar light-guiding unit, a second bar light-guiding unit, a first plate light-guiding unit and a second plate light-guiding unit. The first bar light-guiding unit and the second bar light-guiding unit are bar-shaped light-guiding units each of which includes a front face disposed on the front side and a rear face disposed on the rear side, which is on the opposite side of the front side, and are disposed in parallel via a space. The first plate light-guiding unit is a plate-shaped light-guiding unit which includes a front face disposed on the front side and a rear face disposed on the rear side, which is on the opposite side of the front side, and includes one edge connected to an outer peripheral surface of the first bar lighting-guiding unit, and the other edge disposed on the opposite side of the one edge. The other edge of the first plate light-guiding unit extends along the opening edge in the front view. The second plate light-guiding unit is a plate-shaped light-guiding unit which includes a front face disposed on the front side and a rear face disposed on the rear side which is on the opposite side of the front side, and includes one edge connected to an outer peripheral surface of the first bar light-guiding unit, and the other edge connected to an outer peripheral surface of the second bar light-guiding unit. Each of the rear faces of the first and second bar light-guiding units includes a plurality of first structures configured to diffuse the light from the light source, which is guided inside the light source, and allow the light to emit through each of the front faces of the first and second bar light-guiding units respectively, and each of the rear faces of the first and second plate light-guiding units includes a plurality of second structures configured to diffuse the light from the light source, which is guided inside the light guide, and allow the light to emit through each of the front faces of the first and second plate light-guiding units respectively.

According to this aspect, a vehicular lamp fitting, which prevents nonuniformity of the space between the outer peripheral edge of the light guide and the opening edge of the lamp case (particularly the irregular-shaped opening edge) including a curved portion, and allows the bar light-guiding unit and the plate light-guiding unit to emit light uniformly (or approximately uniformly), can be provided.

This is because the outer peripheral edge of the light guide is not the bar light-guiding unit, but the other edge of the plate light-guiding unit, and this other edge of the plate light-guiding unit extends along the opening edge of the lamp case.

It is preferable that this invention further includes a plurality of light guides. The plurality of light guides include at least a first light guide and a second light guide, and the first light guide and the second light guide are disposed in a state of being at least partially overlapped in the front view.

According to this aspect, a new light-emitting appearance, where the overlapped portion of the first light guide and the second light guide is relatively brighter, can be implemented.

In this invention, it is preferable that the first light guide and the second light guide are disposed in a state where the bar light-guiding unit of the first light guide and the bar light-guiding unit of the second light guide are partially overlapped, the bar light-guiding unit of the first light guide and the plate light-guiding unit of the second light guide are partially overlapped, and the plate light-guiding unit of the first light guide and the plate light-guiding unit of the second light guide are partially overlapped in the front view.

According to this aspect, the partially overlapped portion of the bar light-guiding unit of the first light guide and the bar light-guiding unit of the second light guide is the brightest, and the brightness decreases in the sequence of: a partially overlapped portion of the bar light-guiding unit of the first light guide and the plate light-guiding unit of the second light guide; a partially overlapped portion of the plate light-guiding unit of the first light guide and the plate light-guiding unit of the second light guide; and other portions. In other words, a new three-dimensional light-emitting appearance with a sense of depth, where brightness gradually changes, can be implemented.

In this invention, it is preferable that the opening edge is a T-shaped opening edge that surrounds a first space which extends in a first direction, and a second space which extends in a second direction which crosses the first direction. The first light guide is disposed in a first space in a state where the bar light-guiding unit of the first light guide extends in the first direction, and the second light guide is disposed in the second space in a state where the bar light-guiding unit of the second light guide extends in the second direction.

According to this aspect, it can be prevented that the space between the outer peripheral edge of the light guide and the T-shaped opening edge of the lamp case becomes nonuniform, and each of the bar light-guiding unit and the plate light-guiding unit can emit light uniformly (or approximately uniformly).

It is preferable that this invention further includes a substrate on which the light source is mounted. The light guide further includes a fixing unit to which the substrate is fixed, and the substrate is fixed to the fixing unit in a state where the light source faces one end face of the bar light-guiding unit.

According to this aspect, the substrate on which the light source is mounted can be fixed to the light guide itself, hence compared with the case of fixing the light source to a housing or the like other than the light guide, the light source can be more accurately positioned with respect to one end face of the bar light-guiding unit.

In this invention, it is preferable that the lamp case further includes an extended portion which extends backward from the opening edge in a state of maintaining a space from the lamp case. The substrate is disposed in the space between the lamp case and the extended portion.

According to this aspect, the substrate on which the light source is mounted is covered by the extended portion, hence it can be prevented that this substrate, on which the light source is mounted, is visually recognized from the front side.

BRIEF DESCRIPTION OF DRAWINGS

FIG. 9 is a perspective view of the reflector 30 in a state where the first light guide 40A is disposed in the first space S1a;

DESCRIPTION OF EMBODIMENTS

A vehicular lamp fitting 10, which is an embodiment of the present invention, will be described with reference to the accompanying drawings. In each drawing, corresponding components are denoted with a same reference sign, and redundant description thereof is omitted.

Figure 1:
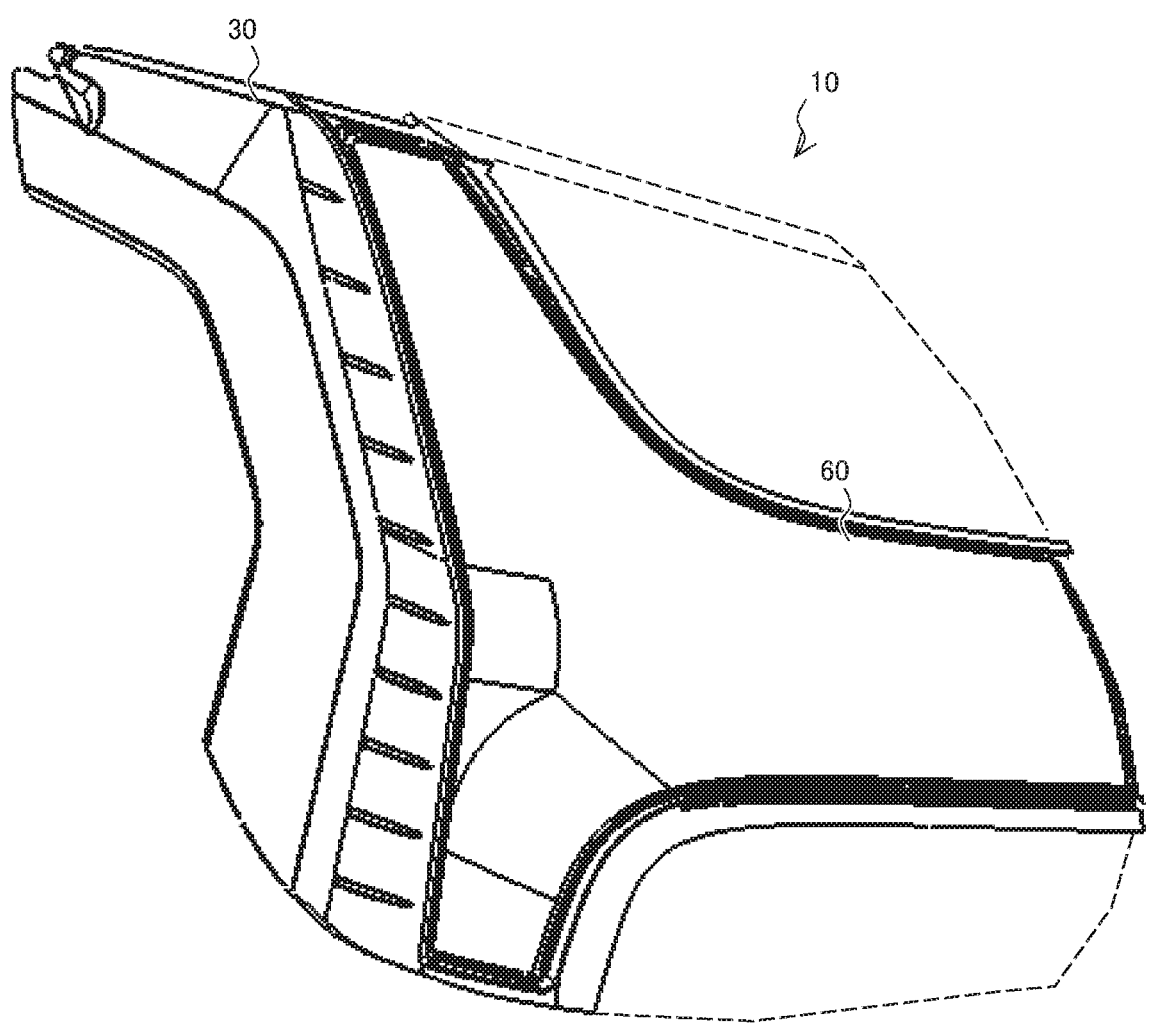
FIG. 1 is a perspective view of the vehicular lamp fitting 10.
Figure 1:
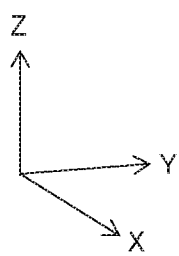

FIG. 1 is a perspective view of the vehicular lamp fitting 10.

The vehicular lamp fitting 10 illustrated in FIG. 1 is a vehicular signal lamp fitting which functions as a tail lamp. The vehicular lamp fitting 10 is disposed on both the left and right sides of the rear end portion of a vehicle such as an automobile (not illustrated) respectively. The vehicular lamp fittings 10 are disposed on the left and right sides so as to be bilaterally symmetrical, hence the vehicular lamp fitting 10, which is disposed on the left side of the rear end portion of the vehicle (left side when viewing from the rear side to the front side of the vehicle), will be described. To simplify description in the following, "front side" refers to the rear side of the vehicle, and "rear side" refers to the front side of the vehicle. Further, to make description easier, the XYZ axes are defined. The X axis extends in the longitudinal direction of the vehicle, the Y axis extends in the width direction of the vehicle, and the Z axis extends in the vertical direction.

Figure 2:
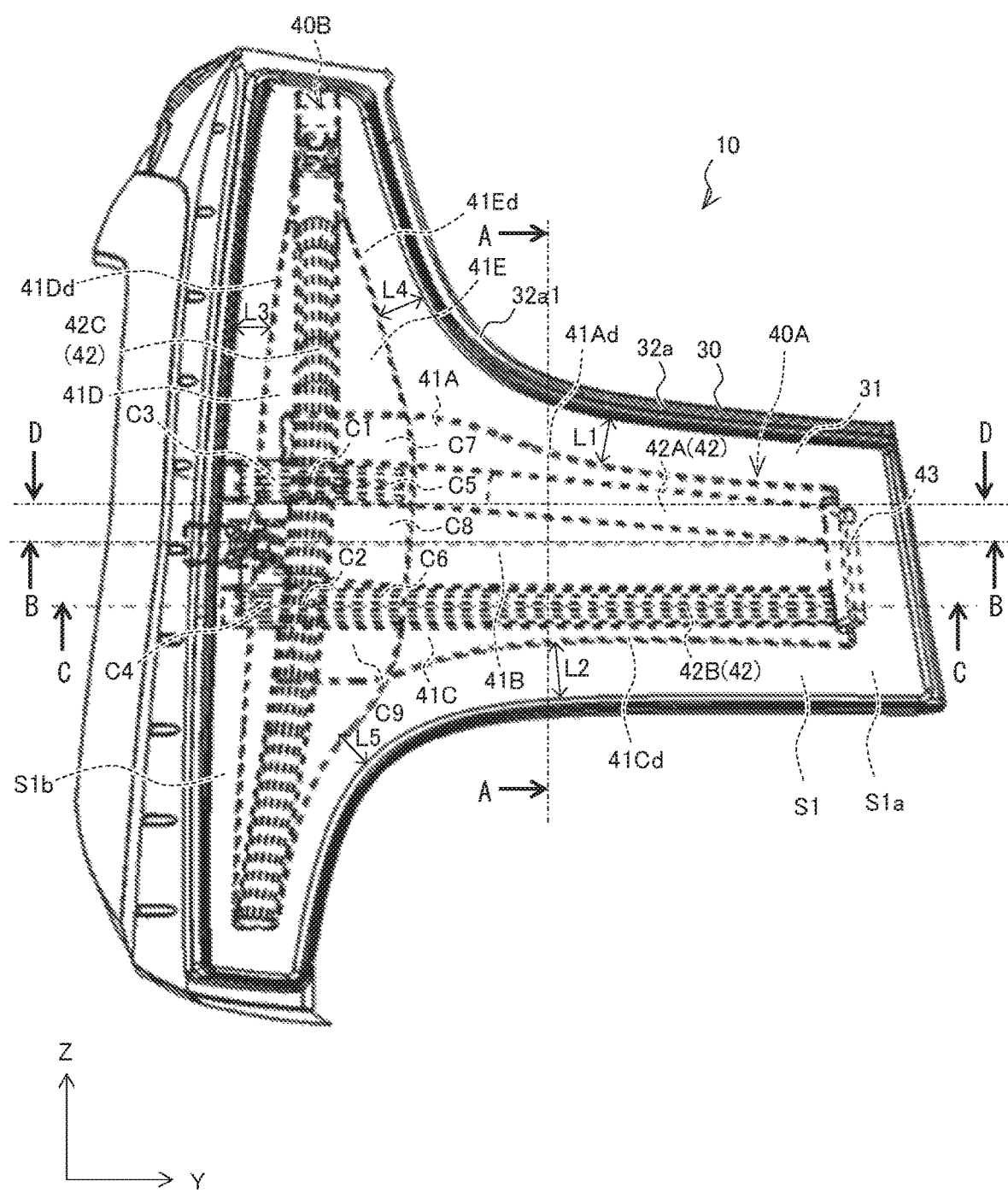
FIG. 2 is a front view of the vehicular lamp fitting 10.
Figure 3:
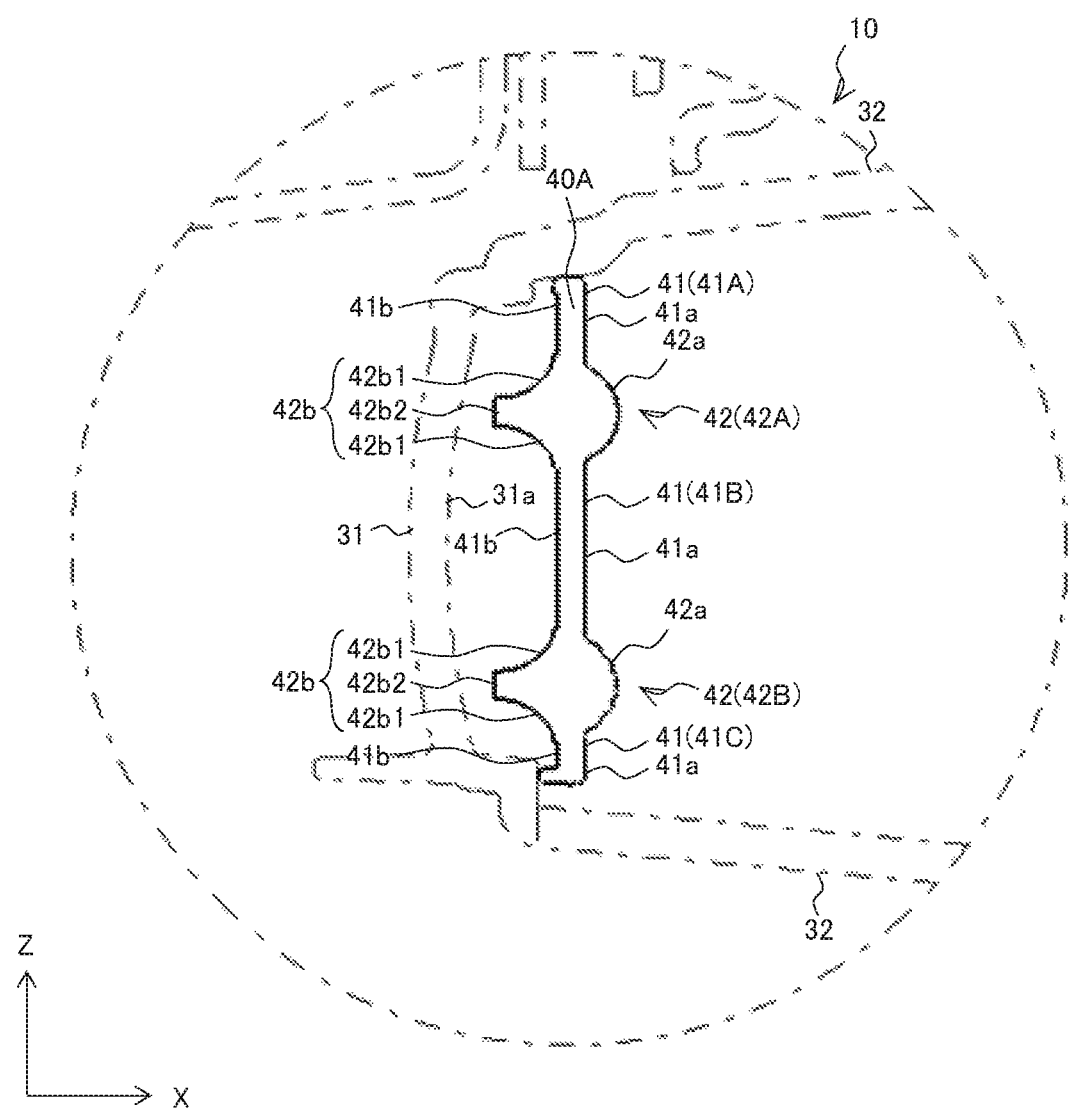
FIG. 3 is an A-A cross-sectional view of FIG. 2.
Figure 4A:
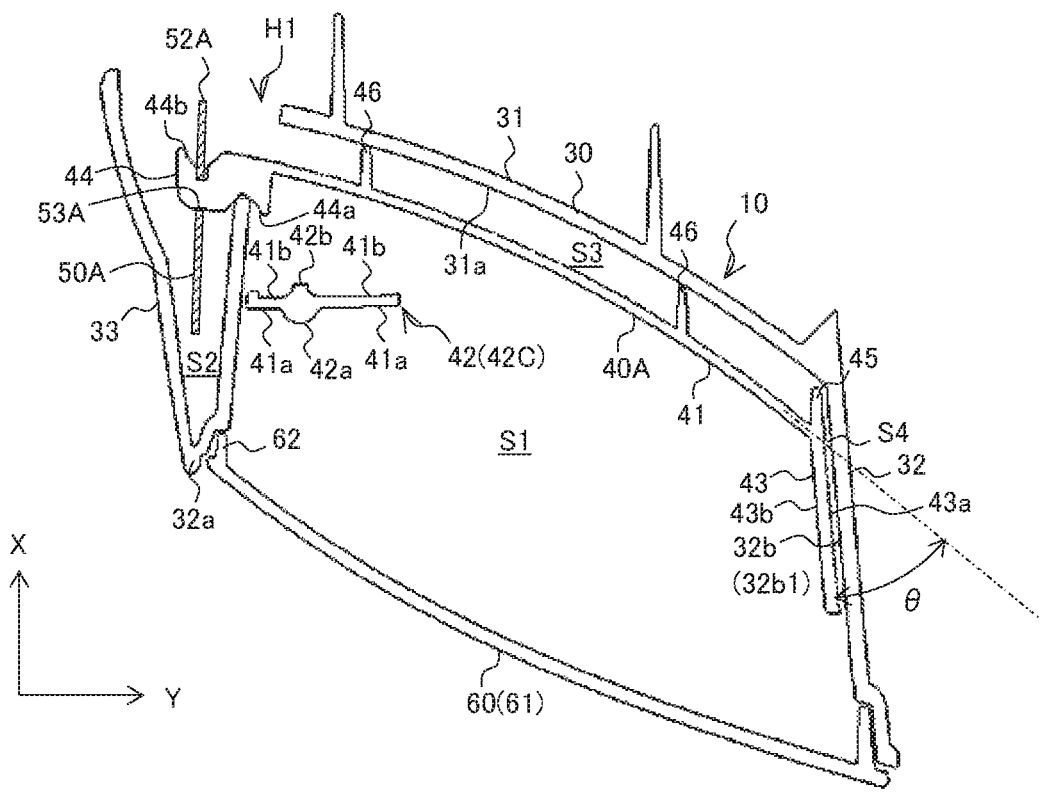
FIG. 4A is a B-B cross-sectional view of FIG. 2.
Figure 4B:
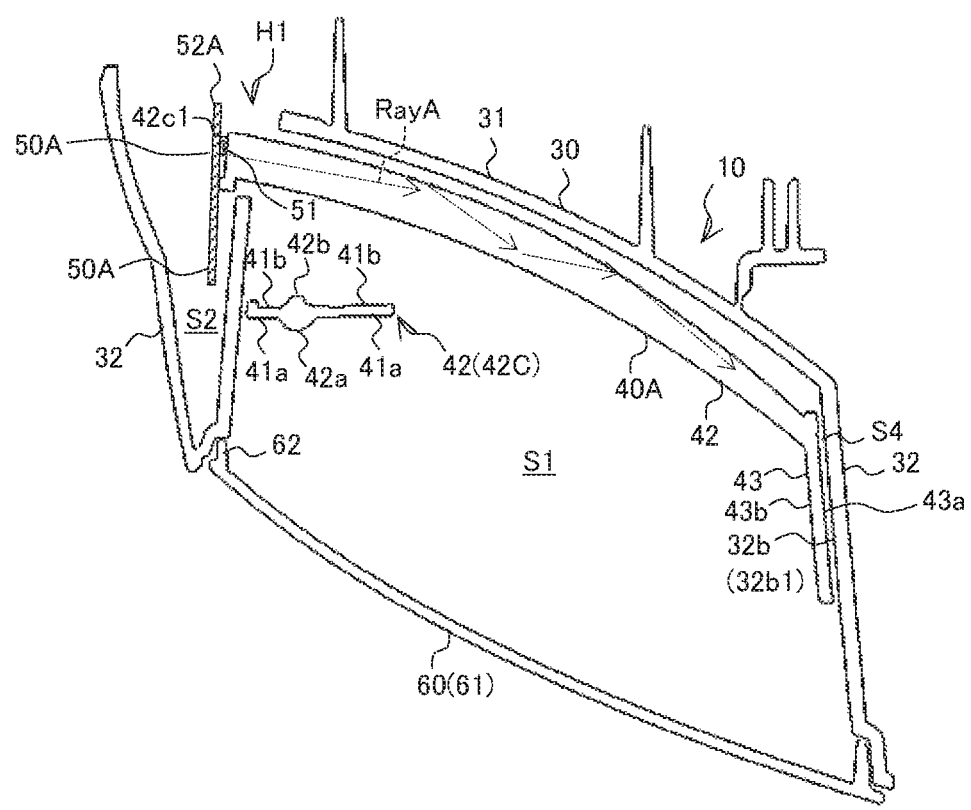
FIG. 4B is a C-C cross-sectional view of FIG. 2.
Figure 5:
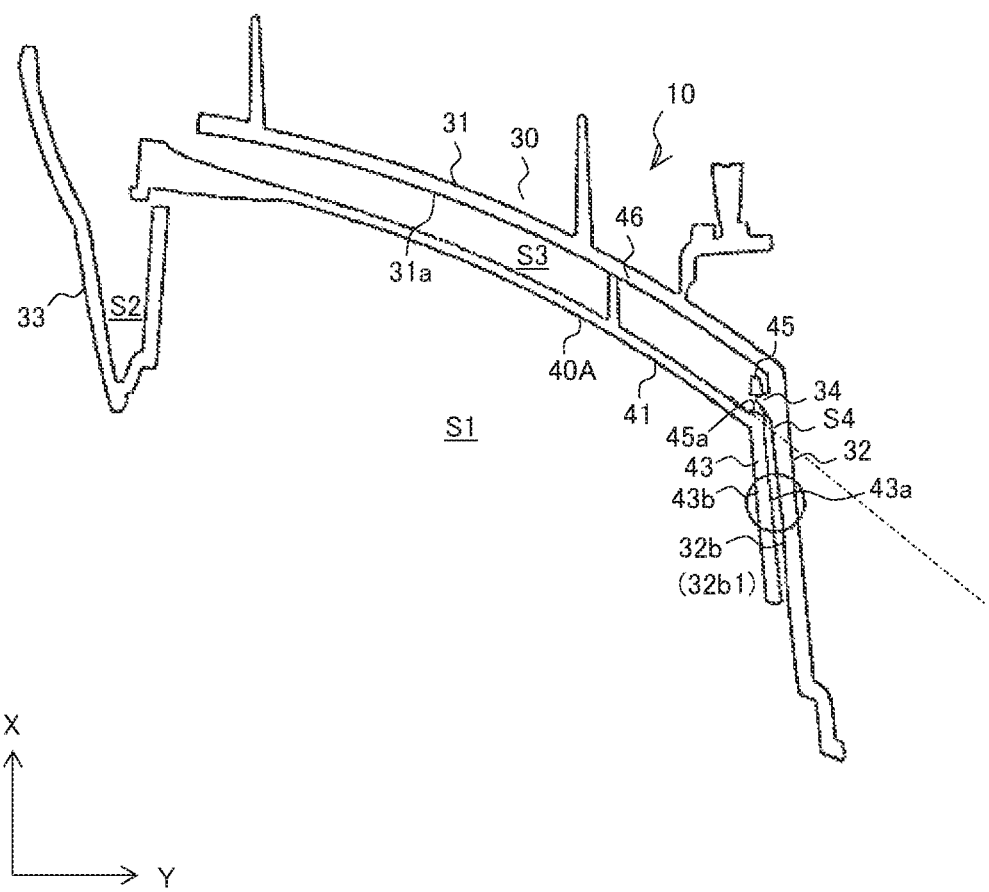
FIG. 5 is a D-D cross-sectional view of FIG. 2 (second light guide 40B, first light source module 50A, and inner lens 60 are omitted)
Figure 6:
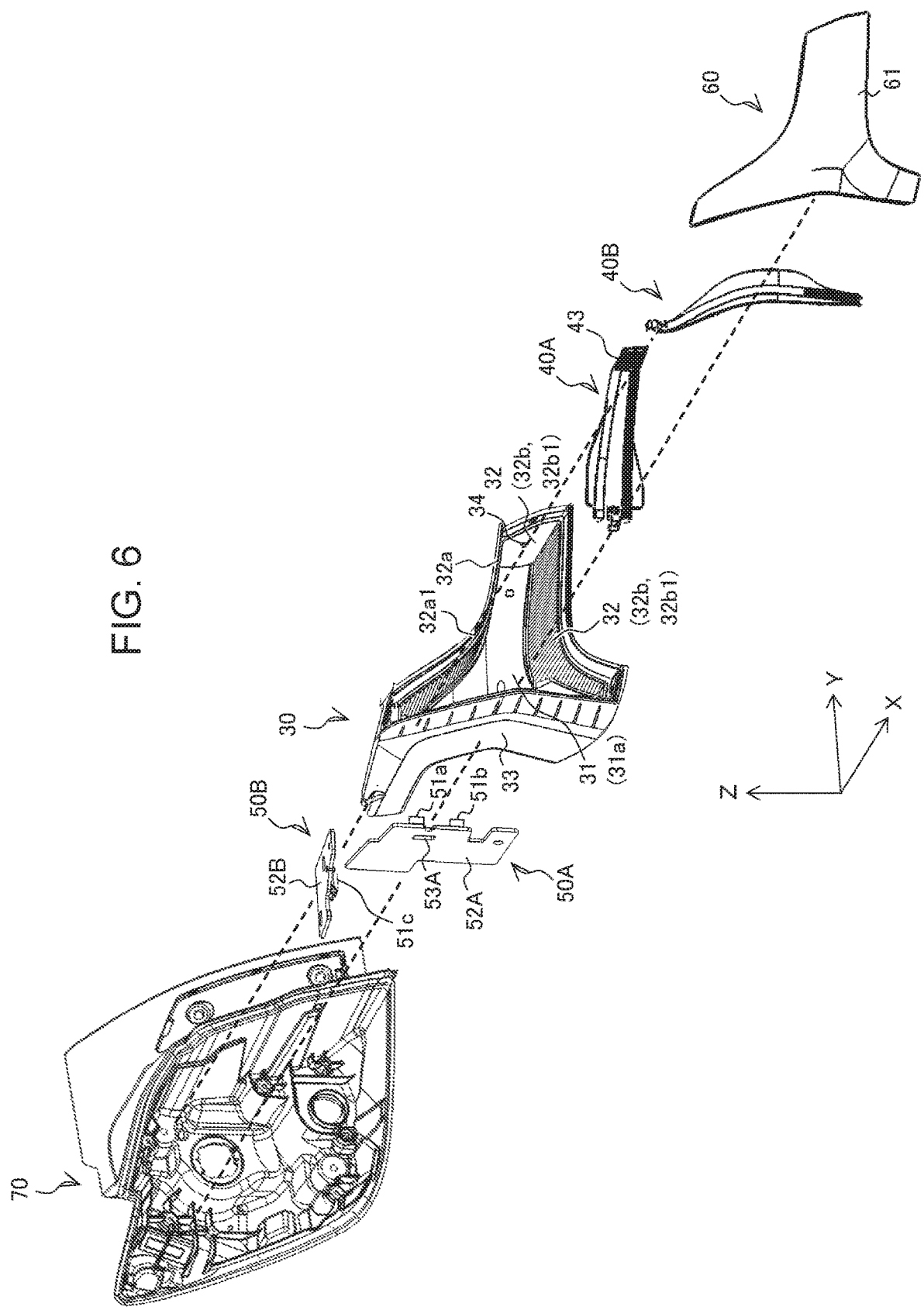
FIG. 6 is an exploded perspective view of the vehicular lamp fitting 10.

FIG. 2 is a front view of the vehicular lamp fitting 10, FIG. 3 is an A-A cross-sectional view of FIG. 2, FIG. 4A is a B-B cross-sectional view of FIG. 2, FIG. 4B is a C-C cross-sectional view of FIG. 2, FIG. 5 is a D-D cross-sectional view of FIG. 2 (second light guide 40B, first light source module 50A and inner lens 60 are omitted), and FIG. 6 is an exploded perspective view of the vehicular lamp fitting 10.

As illustrated in FIG. 2 to FIG. 6, the vehicular lamp fitting 10 includes a reflector 30, a first light guide 40A, a second light guide 40B, a first light source module 50A, a second light source module 50B and an inner lens 60. The vehicular lamp fitting 10 is disposed in a lamp chamber constituted of an outer lens (not illustrated) and a housing 70 (see FIG. 6), and is fixed to the housing.

As illustrated in FIG. 2, the vehicular lamp fitting 10 includes first to third bar light-guiding units 42A to 42C. Each of the first to third bar light-guiding units 42A to 42C forms a bar light-emitting region respectively. Each of the first to third bar light-guiding units 42A to 42C has a similar configuration. Hereafter the first to third bar light-guiding units 42A to 42C are called the bar light-guiding unit 42 if no special distinction is required.

The vehicular lamp fitting 10 also includes first to fifth plate light-guiding units 41A to 41E. Each of the first to fifth plate light-guiding units 41A to 41E forms a surface light-emitting region. Each of the first to fifth plate light-guiding units 41A to 41E have a similar configuration. Hereafter the first to fifth plate light-guiding units 41A to 41E are called the plate light-guiding unit 41 if no special distinction is required.

The relationship between the bar light-guiding unit 42 (diameter) and the plate light-guiding unit 41 (thickness) is: bar light-guiding unit 42 (e.g. diameter: 8 mm)>plate light-guiding unit 41 (e.g. thickness: 2 mm).

As illustrated in FIG. 2 and FIG. 6, the reflector 30 is a lamp case having a T-shaped opening edge 32a which includes a curved portion 32a1 on the front face side. A material of the reflector 30 is synthetic resin such as acrylic or polycarbonate.

In concrete terms, the reflector 30 includes: a T-shaped bottom portion 31 which is disposed on the rear face side; a wall portion 32 (see FIG. 3, FIG. 4A) having the opening edge 32a which is disposed on the front face side extending forward from the outer peripheral edge of the T-shaped bottom portion 31; and a T-shaped space S1 which is surrounded by the bottom portion 31 and the wall portion 32, and of which front side opens in the T-shape.

As illustrated in FIG. 2, the T-shaped space S1 is a T-shaped space which is the letter T rotated about 90° to the left when viewed from the front. The T-shaped space S1 includes a first space S1a which extends in the Y direction (an example of a "first direction" in the invention), and a second space S1b which extends in the Z direction (an example of a "second direction" in the invention).

The opening edge 32a of the reflector 30 is a T-shaped opening edge which is the letter T rotated about 90° to the left when viewed from the front, and surrounds the T-shaped space S1 when viewed from the front.

As illustrated in FIG. 4A and FIG. 4B, the reflector 30 includes an extended portion 33 which extends backward from the opening edge 32a of the reflector 30 in a state of maintaining a space S2 with the reflector 30 (wall portion 32). In the space S2, the first light source module 50A is disposed.

The extended portion 33 of the reflector 30 covers the first light source module 50A disposed in this space S2, so that the first light source module 50A, disposed in the space S2, is not visually recognized from the front side.

Figure 9:
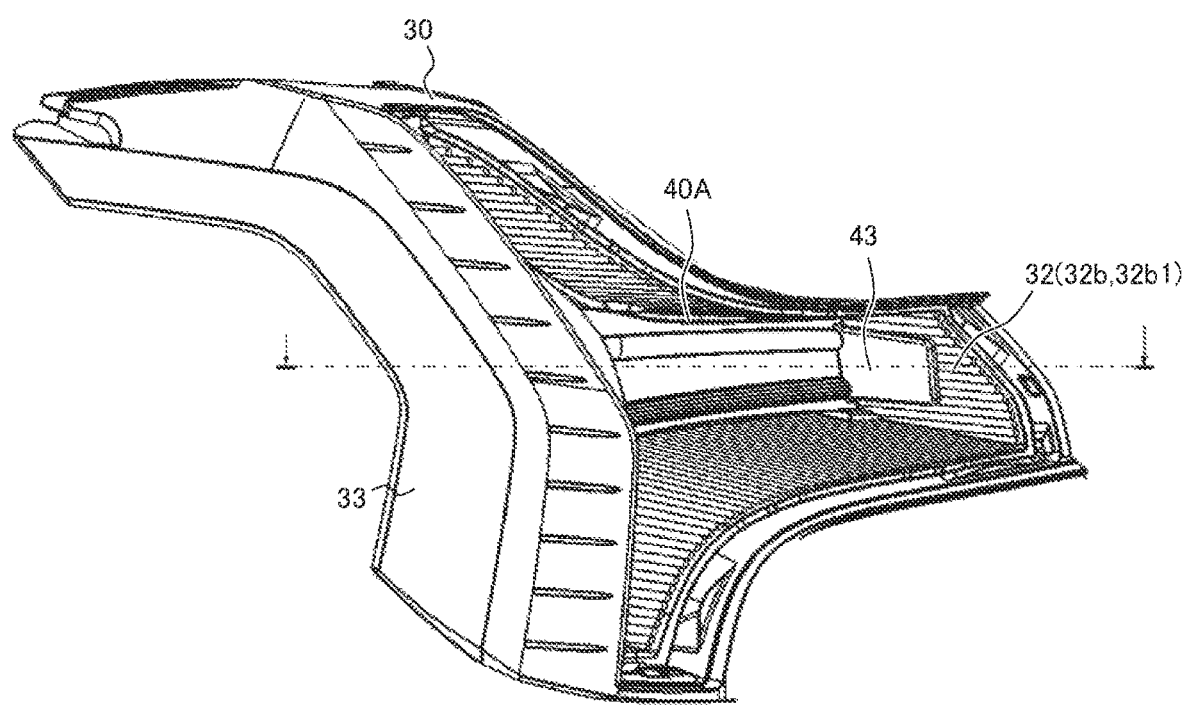

As illustrated in FIG. 9, a plurality of knurls 32b are disposed on the wall portion 32 of the reflector 30 (inner side face). The knurl 32b is a cylindrical surface (or almost cylindrical surface) of which cylindrical axis extends in the X axis direction, for example.

On the inner side face (T-shape consisting of the bottom portion 31 and the wall portion 32) of the reflector 30, aluminum is deposited so as to form a reflection surface.

Hereafter the reflection surface formed on the bottom portion 31 of the T-shape is called a bottom reflection surface 31a, and the reflection surface formed on the wall portion 32 (a plurality of knurls 32b) is called a knurl reflection surface 32b1.

As illustrated in FIG. 3, FIG. 4A and FIG. 4B, the bottom reflection surface 31a is disposed on the rear side of the first light guide 40A, so as to face the rear face of the first light guide 40A. The knurl reflection surface 32b1 is disposed with a first surface 43a of an extended end portion 43 of the first light guide 40A facing each other across a space S4.

The bottom reflection surface 31a reflects light emitted through the rear face of the first light guide 40A and the rear face of the second light guide 40B, for example. The knurl reflection surface 32b1 reflects (diffuses) light emitted from the extended end portion 43 of the first light guide 40A, for example. The extended end portion 43 will be described later.

Figure 7A:
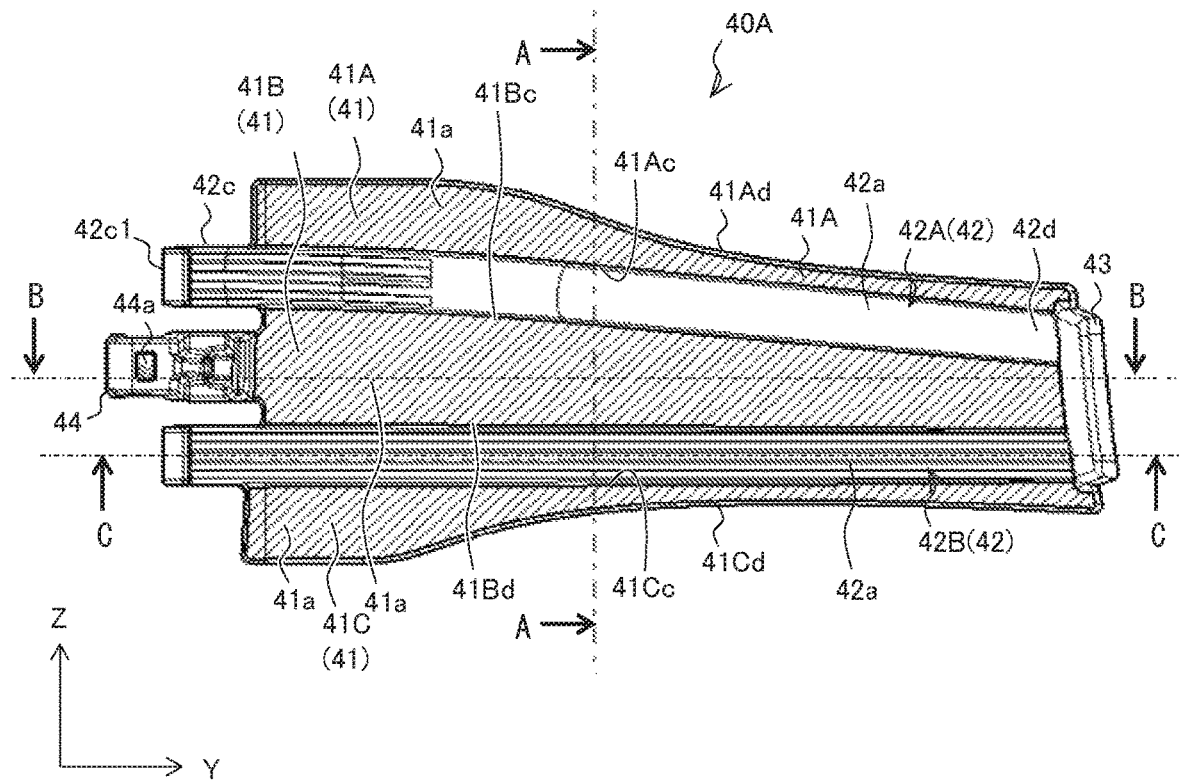
FIG. 7A is a front view of the first light guide 40A.
Figure 7B:
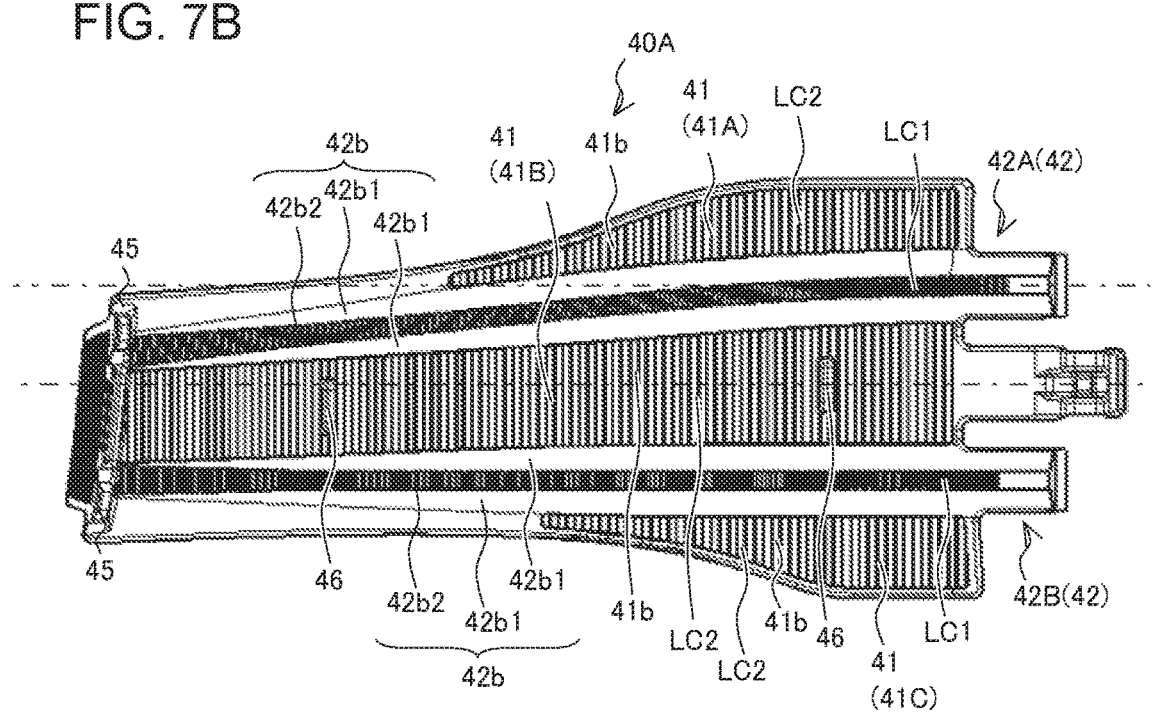
FIG. 7B is a rear view thereof.

FIG. 7A is a front view of the first light guide 40A, and FIG. 7B is a rear view thereof.

As illustrated in FIG. 7A and FIG. 7B, the first light guide 40A includes a bar light-guiding unit 42 (first bar light-guiding unit 42A, second bar light-guiding unit 42B) and a plate light-guiding unit 41 (first plate light-guiding unit 41A, second plate light-guiding unit 41B, third plate light-guiding unit 41C). The material of the first light guide 40A is a transparent resin (e.g. acrylic, polycarbonate).

The first bar light-guiding unit 42A and the second bar light-guiding unit 42B are disposed in parallel with a space between them.

The bar light-guiding unit 42 (first and second bar light-guiding units 42A, 42B) includes a front face 42a (see FIG. 7A) which is disposed on the front side, and the rear face 42b (see FIG. 7B) disposed on the rear side, which is the opposite side of the front side. The bar light-guiding unit 42 is a long bar light-guiding unit which extends from one edge portion 42c (hereafter also called the left edge portion 42c) to the other edge portion 42d (hereafter also called the right edge portion 42d), approximately in the Y axis direction, as illustrated in FIG. 7A.

As illustrated in FIG. 3, a cross-sectional shape of the bar light-guiding unit 42 sectioned by a plane orthogonal to the Y axis direction (XZ plane in FIG. 3) is approximately ginko leaf-shaped surrounded by the front face 42a and the rear face 42b (a pair of the side faces 42b1 and the hindmost face 42b2). In concrete terms, the bar light-guiding unit 42 is constructed as follows.

The front face 42a of the bar light-guiding unit 42 is a curved surface so that the cross-sectional shape of the bar light-guiding unit 42 sectioned by the plane orthogonal to the longer direction (XZ plane in FIG. 3) is an arc which convex toward the front side (right side in FIG. 3). The front face 42a of the bar light-guiding unit 42 is a cylindrical surface of which cylindrical axis extends in the Y axis direction, for example.

A lens cut is performed on the front face 42a of the bar light-guiding unit 42, so that the light emitted from the front face 42a is controlled to satisfy the light distribution standard of the tail lamp. This lens cut processing may be omitted if the light distribution standard of the tail lamp is satisfied without the lens cut.

The rear face 42b of the bar light-guiding unit 42 includes: a pair of side faces 42b1 which has a pair of arc shapes, which are disposed so that the cross-sectional shape of the bar light-guiding unit 42 sectioned by a plane orthogonal to the longer direction of the bar light-guiding unit 42 (the XZ plane in FIG. 3) is convex toward the inside of the bar light-guiding unit 42, and space decreases as approaching the rear side (left side in FIG. 3); and a hindmost face 42b2, which connects the pair of side faces 42b1 so that the cross-sectional shape of the bar light-guiding unit 42 sectioned by a plane orthogonal to the longer direction of the bar light-guiding unit 42, is a linear shape connecting the edges (left edges in FIG. 3) of the pair of arcs.

As illustrated in FIG. 7B, the rear face 42b (hindmost face 42b2) of the bar light-guiding unit 42 includes a plurality of first structures LC1 which diffuse the light from a first light source module 50A, guided inside the first light guide 40A, and emits the light through the front face 42a of the bar light-guiding unit 42. The first structure LC1 is a lens cut, such as V-grooves, for example.

A light RayA from the first light source module 50A (see FIG. 4B), which entered the bar light-guiding unit 42 through a left end face 42c1 (light entry face) of the bar light-guiding unit 42, decreases as the distance from the left end face 42c1 (light entry face) of the bar light-guiding unit 42 increases, but the light can be uniformly (or approximately uniformly) emitted from the bar light-guiding unit 42 by increasing a number of (density of) of the first structures LC1 as the distance from the first light source module 50A increases.

As illustrated in FIG. 7A, the left edge 42c of the bar light-guiding unit 42 protrudes from the left edge of the plate light-guiding unit 41. The left end face 42c1 (light entry face) of the bar light-guiding unit 42 is a plane that is parallel with the XZ plane, for example. The right edge 42d of the bar light-guiding unit 42 extends to the right edge of the plate light-guiding unit 41.

Figure 8:
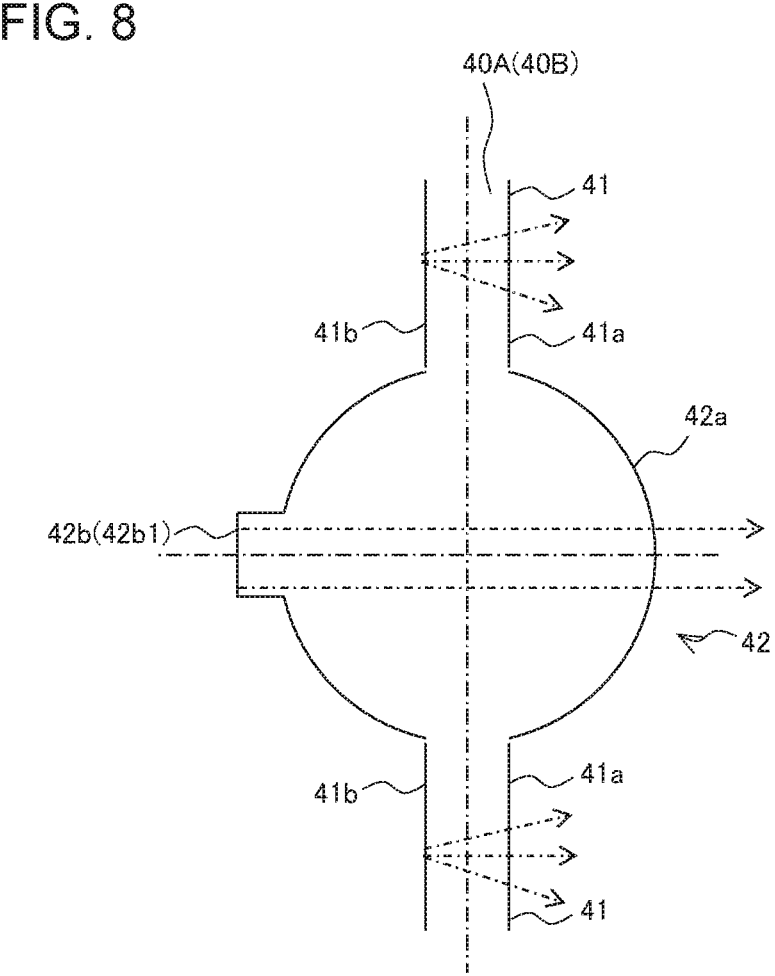
FIG. 8 is a cross-sectional view of a modification of the bar light-guiding unit 42.

FIG. 8 is a cross-sectional view of a modification of the bar light-guiding unit 42.

As illustrated in FIG. 8, a standard bar light-guiding unit of which cross-sectional shape is circular may be used instead of the bar light-guiding unit 42 of which cross-sectional shape is approximately ginko leaf shaped, but if the bar light-guiding unit 42 of which cross-sectional shape is approximately ginko leaf-shaped is used, light can be emitted from the bar light-guiding unit 42 more brightly compared with the case of using the standard bar light-guiding unit of which cross-sectional shape is circular.

The plate light-guiding unit 41 is a plate-shaped light-guiding unit that includes a front face 41a disposed on the front side (see FIG. 7A), and a rear face 41b disposed on the rear side which is on the opposite side of the front side (see FIG. 7B). As illustrated in FIG. 3, the front face 41a and the rear face 41b of the plate light-guiding unit 41 are planes or almost planar surfaces respectively, and are disposed to be parallel with each other.

A lens cut is performed on the front face 41a of the plate light-guiding unit 41, so that the light emitted from the front face 41a is controlled to satisfy the light distribution standard of the tail lamp. The lens cut processing may be omitted if the light distribution standard of the tail lamp is satisfied without the lens cut.

As illustrated in FIG. 7A and FIG. 7B, the first plate light-guiding unit 41A includes one edge 41Ac which is connected to the outer peripheral surface of the first bar light-guiding unit 42A and the other edge 41Ad (outer peripheral edge) on the opposite side of the one edge 41Ac.

As illustrated in FIG. 2, the other edge 41Ad (at least a part of the other edge 41Ad) of the first plate light-guiding unit 41A extends along the opening edge 32a of the reflector 30 in a state of maintaining a uniform (or approximately uniform) space from the opening edge 32a of the reflector 30 in the front view (see the space indicated by L1 in FIG. 2).

As illustrated in FIG. 7, the second plate light-guiding unit 41B includes one edge 41Bc which is connected to the outer peripheral surface of the first bar light-guiding unit 42A, and the other edge 41Bd which is connected to the outer peripheral surface of the second bar light-guiding unit 42B.

The third plate light-guiding unit 41C includes one edge 41Cc which is connected to the outer peripheral surface of the second bar light-guiding unit 42B and the other edge 41Cd (outer peripheral edge) which is on the opposite side of the one edge 41Cc.

As illustrated in FIG. 2, the other edge 41Cd (at least a part of the other edge 41Cd) of the third plate light-guiding unit 41C extends along the opening edge 32a of the reflector 30 in a state of maintaining a uniform (or approximately uniform) space from the opening edge 32a of the reflector 30 in the front view (see the space indicated by L2 in FIG. 2).

As illustrated in FIG. 7B, the rear face 41b of the plate light-guiding unit 41 includes a plurality of second structures LC2 which diffuse the light from the first light source module 50A, guided inside the first light guide 40A, and emits the light through the front face 41a of the plate light-guiding unit 41. The second structure LC2 is a lens cut, such as V-grooves, for example.

The light RayA from the first light source module 50A (see FIG. 4B), which entered the bar light-guiding unit 42 from the left end face 42c1 (light entry face) of the bar light-guiding unit 42, decreases as the distance from the left end face 42c1 (light entry face) of the bar light-guiding unit 42 increases, but the light can be uniformly (or approximately uniformly) emitted from the plate light-guiding unit 41 by increasing a number of (density of) the second structures LC2 as the distance from the first light source module 50A increases.

As illustrated in FIG. 7A, in order to fix the first light guide 40A to the reflector 30, the plate light-guiding unit 41 of the first light guide 40A includes a first engaging unit 44a (e.g. groove, see FIG. 4A) with which the periphery of the opening H1 formed in the reflector 30 is engaged. The first engaging unit 44a is disposed in a first fixing unit 44 which extends to the left from the left edge of the second plate light-guiding unit 41B.

Further, as illustrated in FIG. 5, the plate light-guiding unit 41 of the first light guide 40A includes a second engaging unit 45a (e.g. opening) with which a hook 34 (see FIG. 5 and FIG. 6) formed on the reflector 30 is engaged, so as to fix the first light guide 40A to the reflector 30. The second engaging unit 45a is disposed in a second fixing unit 45 (see FIG. 7B) which extends backward from the right edge of the plate light-guiding unit 41.

As a result of study by the present inventors, it was discovered that if the second fixing unit 45 is disposed, point lighting is generated at the right edge of the first light guide 40A (e.g. second fixing unit 45) due to the light from the first light source module 50A which reached the right edge of the first light guide 40A (e.g. right edge 42d of the bar light-guiding unit 42 (first and second bar light-guiding units 42A, 42B)). Further, in some cases point lighting is generated due to the light from the first light source module 50A, which is guided inside the first light guide 40A, emitted directly from the right edge of the plate light-guiding unit 41, and reflected by the wall portion 32 (knurl reflection surface 32b1) of the reflector 30.

To control the point lighting, as illustrated in FIG. 4B, the first light guide 40A (plate light-guiding unit 41) includes an extended end portion 43 which emits the light RayA from the first light source module 50A, which was guided inside the first light guide 40A and reached the right edge of the first light guide 40A, as diffused light. The extended end portion 43 is an example of the end portion of the present invention.

The extended end portion 43 is a plate-shaped light-guiding unit which extends forward from the right edge 42d of the plate light-guiding unit 41, and includes a first surface 43a facing the wall portion 32 of the reflector 30 (knurl reflection surface 32b1) and a second surface 43b which is on the opposite side of the first surface 43a. The first surface 43a includes a plurality of third structures LC3 to diffuse the light RayA from the first light source module 50A, guided inside the extended end portion 43, and emit the light RayA through the second surface 43b (see FIG. 12A). The third structure LC3 is a lens cut, such as V-grooves, for example.

The extended end portion 43 extends in a direction which is inclined from the plate light-guiding unit 41 by angle θ (see FIG. 4A), so that the light from the first light source module 50A which reached the right edge 42d of the plate light-guiding unit 41 is totally reflected, and enters the extended end portion 43.

The first light guide 40A having the above configuration is disposed in the first space S1a of the reflector 30 by fixing the first fixing unit 44 and the second fixing unit 45 to the reflector 30.

In concrete terms, in the first light guide 40A, the periphery of the opening H1 formed in the reflector 30 is engaged with the first engaging unit 44a (e.g. groove) formed in the first fixing unit 44, as illustrated in FIG. 4A, and the hook 34 formed in the reflector 30 is engaged with the second engaging unit 45a (e.g. opening) formed in the second fixing unit 45, as illustrated in FIG. 5.

Thereby, as illustrated in FIG. 2, the first light guide 40A is disposed in the first space S1a of the reflector 30 in a state where the extending direction of the bar light-guiding unit 42 of the first light guide 40A matches with the Y axis direction.

At this time, as illustrated in FIG. 4A, ribs 46 (two ribs are exemplified in FIG. 4A), which extend backward from the rear face of the first light guide 40A, contact the bottom portion 31 of the reflector 30, hence the rear face of the first light guide 40A faces the bottom reflection surface 31a of the reflector 30 via a space S3. The extended end portion 43 also faces the knurl reflection face 32b1 of the reflector 30 via the space S4. FIG. 9 is a perspective view of the reflector 30 in a state where the first light guide 40A is disposed in the first space S1a.

As illustrated in FIG. 6, the first light source module 50A includes a first light source 51a, a second light source 51b and a first substrate 52A on which the first and second light sources 51a and 51b are mounted. The second light source module 50B includes a third light source 51c and a second substrate 52B on which the third light source 51c is mounted.

The first to third light sources 51a to 51c have configurations similar to one another. Hereafter the first to third light sources 51a to 51c are called the light source 51 if no special distinction is required.

The light source 51 is a semiconductor light-emitting element (e.g. LED) which emits a red light, for example.

As illustrated in FIG. 4A, the first light source module 50A is fixed to the first light guide 40A (first fixing unit 44).

In concrete terms, in the first substrate 52A, the first fixing unit 44 of the first light guide 40A is inserted, for example, fitted to a through hole 53A formed in the first substrate 52A, and the periphery of the through hole 53A, formed in the first substrate 52A, is engaged with the groove 44b formed in the first fixing unit 44.

Thereby, as illustrated in FIG. 4B, the first light source module 50A is fixed to the first light guide 40A (first fixing unit 44) in a state where the light source 51 mounted on the first substrate 52A faces the left edge 42c (left end face 42c1) of the bar light-guiding unit 42 of the first light guide 40A.

Figure 10:
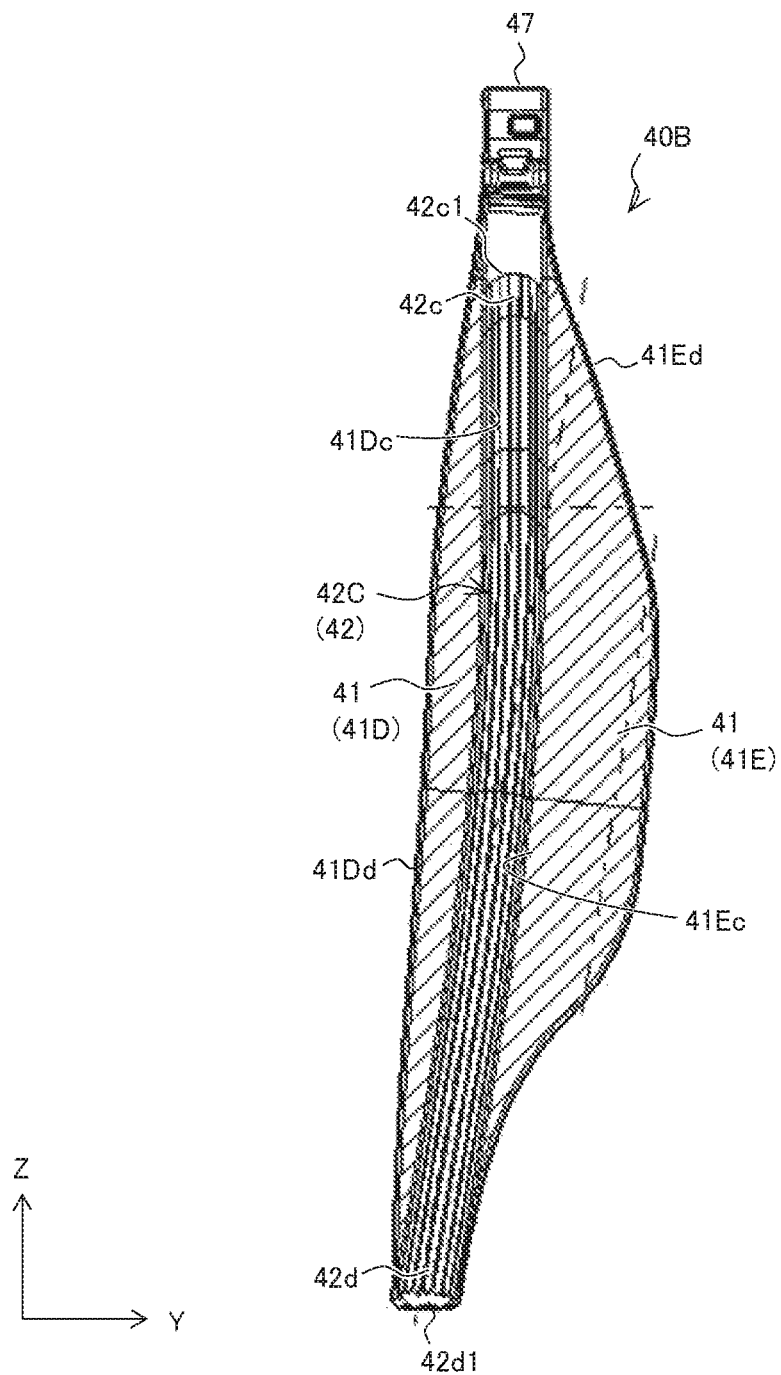
FIG. 10 is a front view of the second light guide 40B.

FIG. 10 is a front view of the second light guide 40B.

As illustrated in FIG. 10, the second light guide 40B includes the bar light-guiding unit 42 (third bar light-guiding unit 42C) and the plate light-guiding units 41 (fourth plate light-guiding unit 41D, fifth plate light-guiding unit 41E). The material of the second light guide 40B is a transparent resin (e.g. acrylic, polycarbonate), for example.

The bar light-guiding unit 42 (third bar light-guiding unit 42C) includes the front face 42a (see FIG. 4A, FIG. 4B and FIG. 10) disposed on the front side, and the rear face 42b (see FIG. 4A and FIG. 4B) disposed on the rear side which is the opposite side of the front side, and is a long bar light-guiding unit which extends approximately in the Z axis direction from one edge portion 42c (hereafter also called the upper edge portion 42c) to the other edge portion 42d (hereafter also called the lower edge portion 42d). The lower edge portion 42d of the bar light-guiding unit extends to the lower edge of the plate light-guiding unit 41.

The second light guide 40B (third bar light-guiding unit 42C) is rounded at the lower edge portion (end portion). For example, the lower edge 42d1 of the second light guide 40B (third bar light-guiding unit 42C) is a convex arc (e.g. convex surface that is downwardly convex). Thereby the linear advancement of the light is suppressed and the diffusion effect is improved. As a result, point lighting (e.g. point lighting generated when the light from the second light source module 50B, guided inside the second light guide 40B, is directly emitted from the lower edge portion of the second light guide 40B, and is reflected by the wall portion 32 (knurl reflection surface 32b1) of the reflector 30) is decreased. To suppress the point lighting, the extended end portion 43 may be disposed at the lower edge portion of the second light guide 40B (third bar light-guiding unit 42C) similarly to the case of the first light guide 40A.

As illustrated in FIG. 10, the fourth plate light-guiding unit 41D includes one edge 41Dc which is connected to the outer peripheral surface of the third bar light-guiding unit 42C, and the other edge 41Dd (outer peripheral edge) on the opposite side of the one edge 41Dc.

As illustrated in FIG. 2, the other edge 41Dd (at least a part of the other edge 41Dd) of the fourth plate light-guiding unit 41D extends along the opening edge 32a of the reflector 30 in a state of maintaining a uniform (or approximately uniform) space from the opening edge 32a of the reflector 30 in the front view (see the space indicated by L3 in FIG. 2).

As illustrated in FIG. 10, the fifth plate light-guiding unit 41E includes one edge 41Ec which is connected to the outer peripheral surface of the third bar light-guiding unit 42C and the other edge 41Ed (outer peripheral edge) on the opposite side of the one edge 41Ec.

As illustrated in FIG. 2, the other edge 41Ed (at least a part of the other edge 41Ed) of the fifth plate light-guiding unit 41E extends along the opening edge 32a of the reflector 30 in a state of maintaining a uniform (or approximately uniform) space from the opening edge 32a of the reflector 30 in the front view (see the spaces indicated by L4 and L5 in FIG. 2).

As illustrated in FIG. 10, in order to fix the first light guide 40A to the reflector 30, the plate light-guiding unit 41 of the second light guide 40B includes a third fixing unit 47 disposed at the upper edge portion of the plate light-guiding unit 41, and a fourth fixing unit (not illustrated) disposed at the lower edge portion of the plate light-guiding unit 41.

By fixing the third fixing unit 47 and the fourth fixing unit to the reflector 30, the second light guide 40B having this configuration is disposed in the second space S1b of the reflector 30 in a state where the extending direction of the bar light-guiding unit 42 of the second light guide 40B matches with the Z axis direction, as illustrated in FIG. 2.

At this time, the rear face of the second light guide 40B faces the bottom reflection surface 31a of the reflector 30 via the first light guide 40A, as illustrated in FIG. 4A.

The second light source module 50B is fixed to the second light guide 40B (third fixing unit 47).

In concrete terms, the second light source module 50B is fixed to the second light guide 40B (third fixing unit 47) in a state where the light source 51, mounted on the second substrate 52B, faces the upper edge portion 42c (upper end face 42c1) of the bar light-guiding unit 42 of the second light guide 40B, just like the case of the first light source module 50A, although this fixing state of the second light source module 50B is not illustrated.

As illustrated in FIG. 4A and FIG. 4B, an inner lens 60 is welded to the reflector 30 to which the first and second light guides 40A and 40B are fixed, as mentioned above.

The inner lens 60 includes a lens main body 61 (see FIG. 6) of which outer shape is the same as the T-shaped opening edge 32a of the reflector 30, and a leg portion 62 (see FIG. 4A) disposed entirely surrounding the outer periphery of the rear face of the lens main body 61.

As illustrated in FIG. 4A, the inner lens 60 configures a lamp chamber (T-shaped space S1) between the inner lens 60 and the reflector 30 by butting the leg portion 62 and the opening edge 32a of the reflector 30 and welding throughout the entire periphery thereof.

In the vehicular lamp fitting 10 having the above configuration, the tail lamp is implemented by lighting the light sources 51 of the first light source module 50A and the second light source module 50B respectively.

Figure 11:
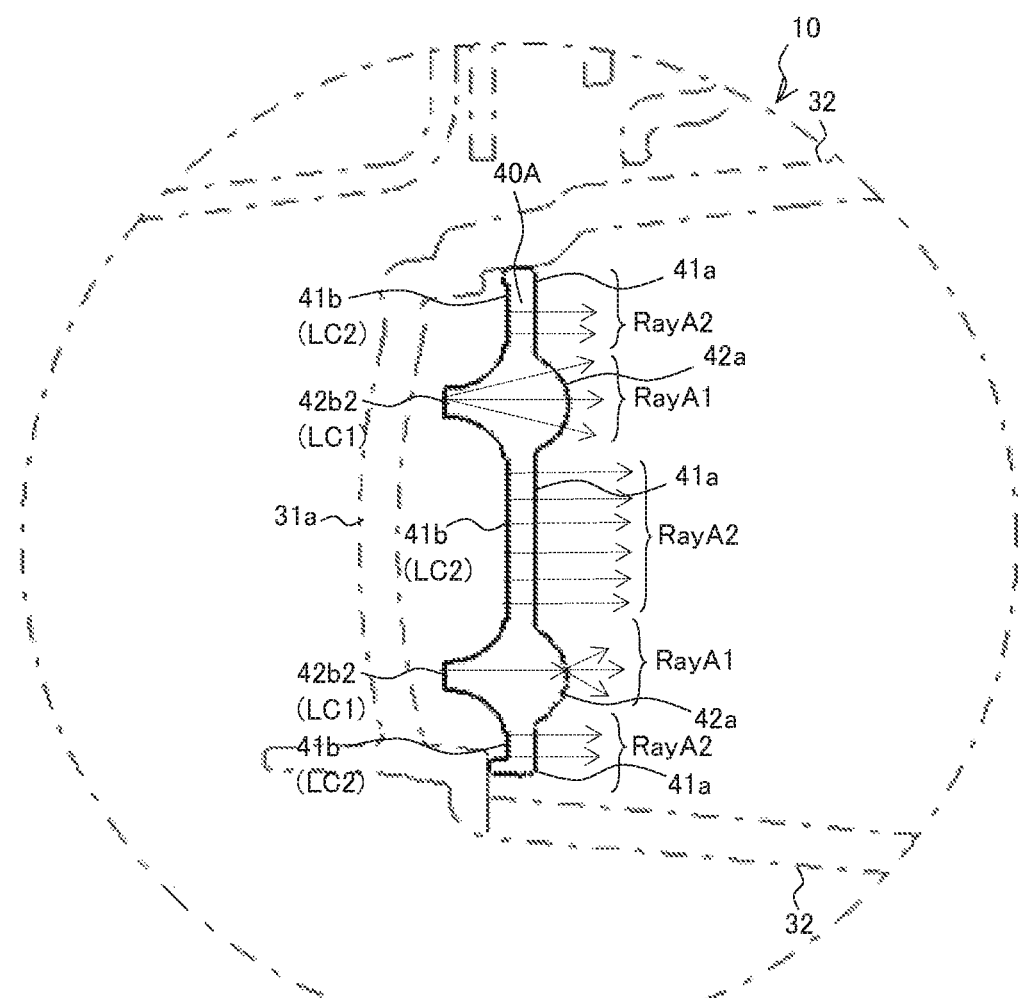
FIG. 11 is a diagram depicting an optical path of the light RayA from the first light source module 50A.

In other words, when the light source 51 of the first light source module 50A is lit, the light RayA from the light source 51 of the first light source module 50A enters the bar light-guiding unit 42 through the left end face 42c1 (entry surface) of the bar light-guiding unit 42 of the first light guide 40A, as illustrated in FIG. 4B, and is guided inside the first light guide 40A from the left edge to the right edge while repeating the internal reflection (total reflection) inside the first light guide 40A. Then as illustrated in FIG. 11, a part of the light RayA is internally reflected (diffusion reflection) by the first structure LC1, and is emitted through the front face 42a of the bar light-guiding unit 42 (see the light indicated by RayA1 in FIG. 11), and another part of the light RayA is internally reflected (diffusion reflection) by the second structure LC2, and is emitted through the front face 41a of the plate light-guiding unit 41 (see the light indicated by RayA2 in FIG. 11). FIG. 11 is a diagram depicting an optical path of the light RayA from the first light source module 50A.

Figure 12A:
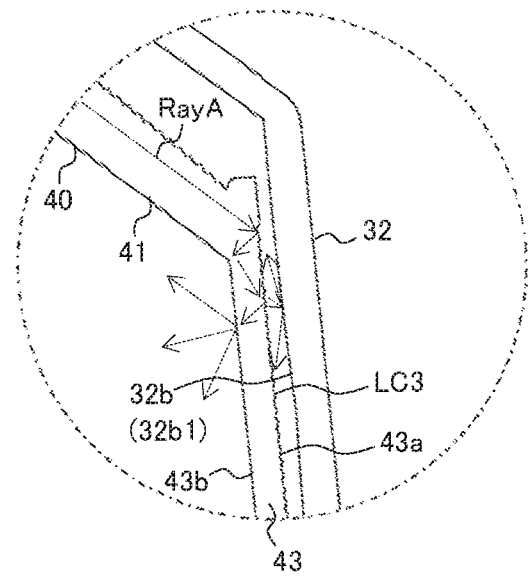
FIG. 12A is a cross-sectional view of the range circled in FIG. 5, sectioned by the XY plane.
Figure 12B:
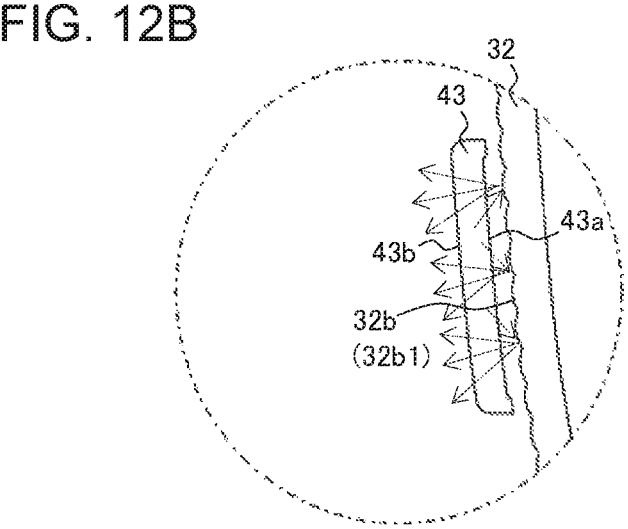
FIG. 12B is a cross-sectional view of the range circled in FIG. 5, sectioned by the YZ plane.
Figure 13:
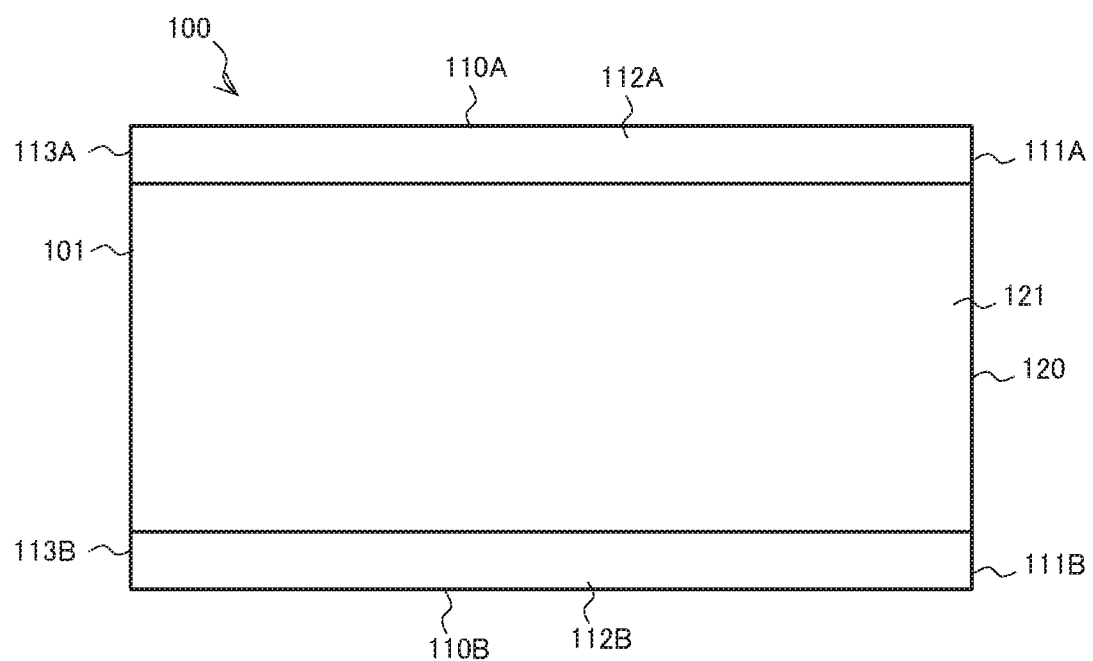
FIG. 13 is a front view of a conventional light guide which includes a bar light-guiding unit and a plate light-guiding unit.
Figure 14:
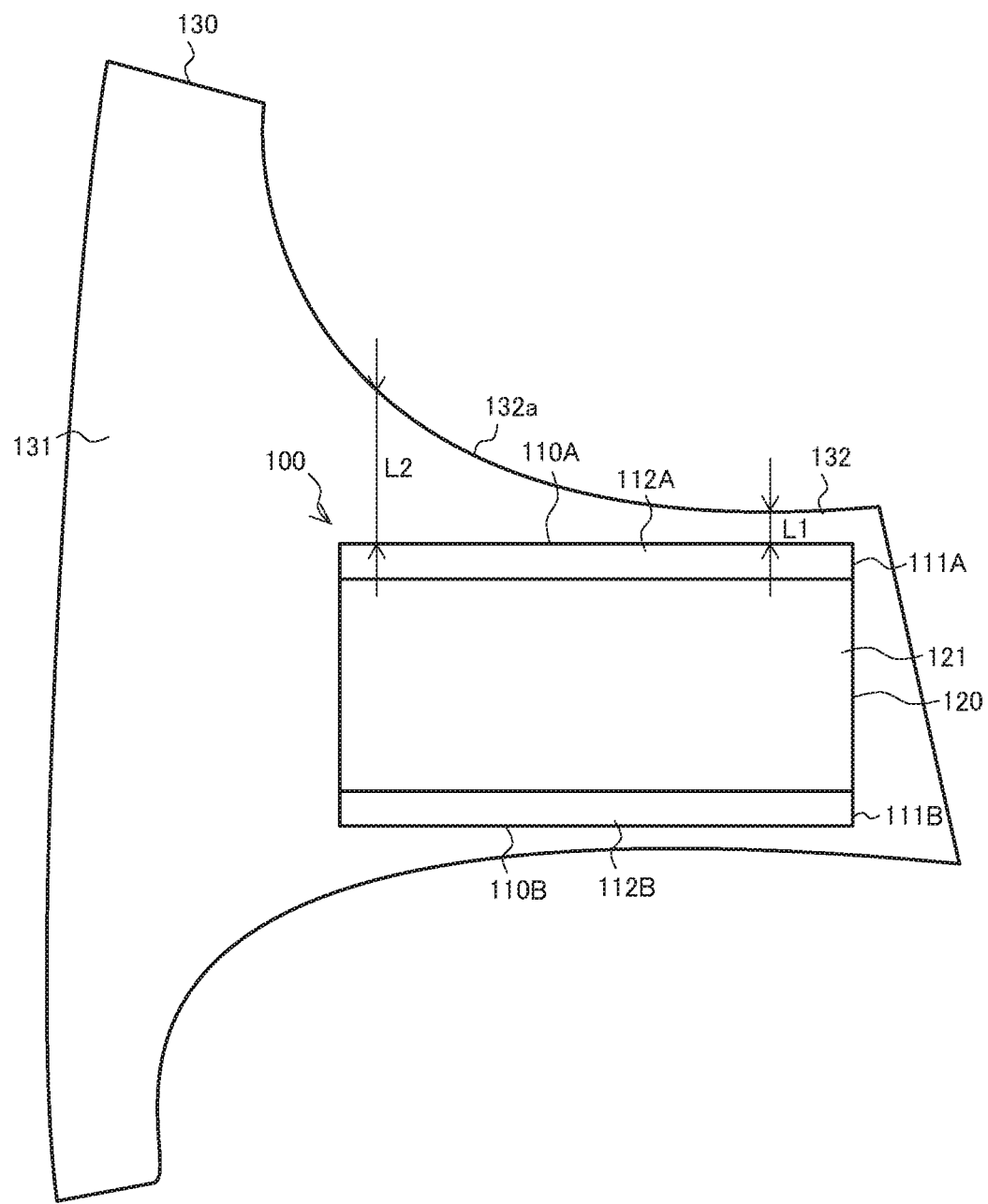
FIG. 14 is a front view of the lamp case 130 having an irregular-shaped opening edge 132 (e.g. T-shaped opening edge), in which the light guide illustrated in FIG. 13 is disposed.
Figure 15:
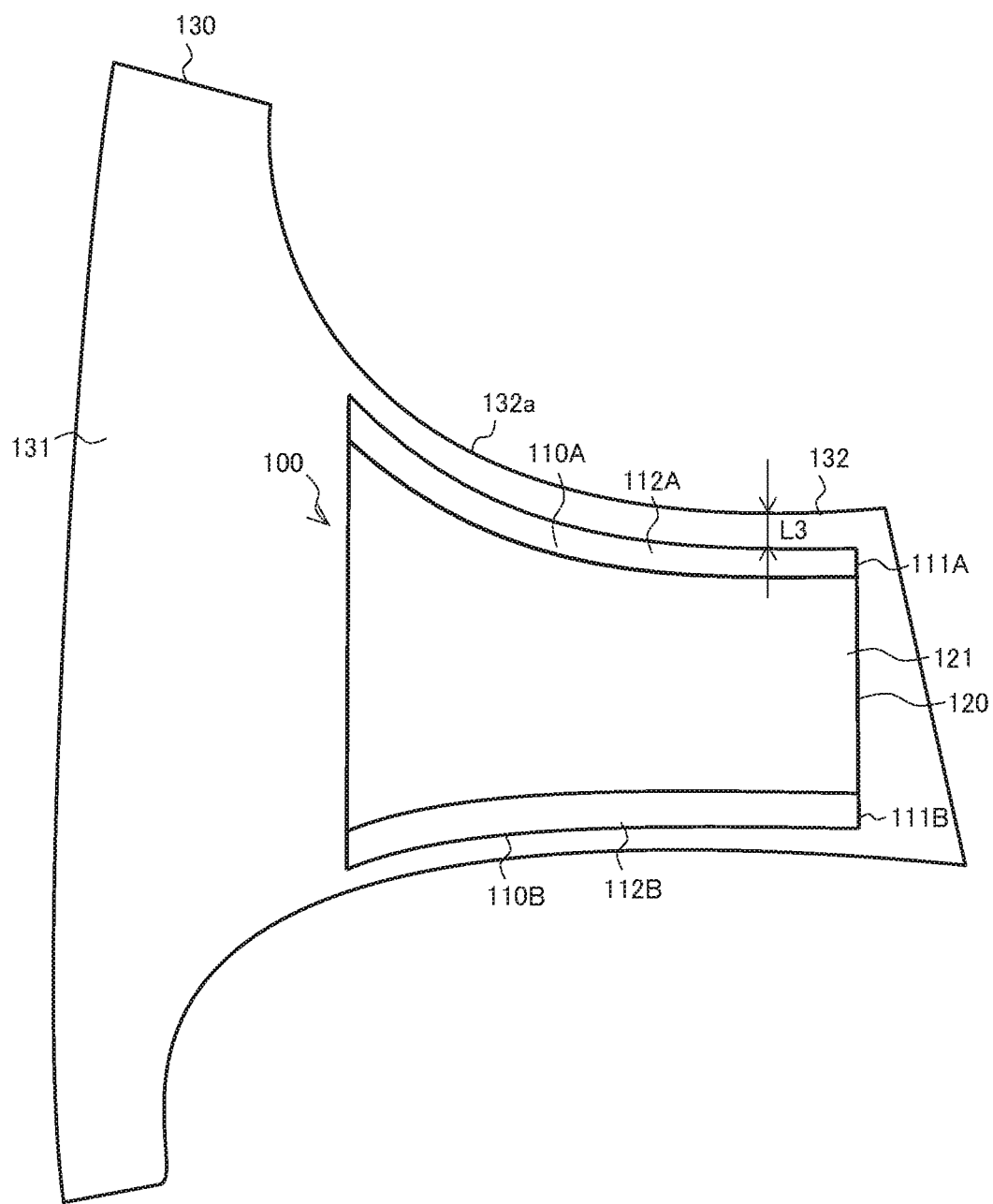
FIG. 15 is a front view of the lamp case 130 having an irregular-shaped opening edge 132 (e.g. T-shaped opening edge), in which the light guide illustrated in FIG. 13 is disposed.

FIG. 12A is a cross-sectional view of the circled range in FIG. 5 sectioned by the XY plane, and FIG. 12B is a cross-sectional view of the circled range in FIG. 5 sectioned by the YZ plane. As illustrated in FIG. 12A and FIG. 12B, a light RayA from the first light source module 50A, which was guided inside the first light guide 40A and reached the right edge of the plate light-guiding unit 41, enters the extended end portion 43, and is guided inside the extended end portion 43 toward the front edge of the extended end portion 43, while repeating the internal reflection (total reflection) inside the extended end portion 43. Then a part of the light RayA is internally reflected by a third structure LC3, and is emitted through the second surface 43b of the extended end portion 43, and another part of the light RayA is emitted through the first surface 43a, is reflected (diffusion reflection) by the wall portion 32 (knurl reflection surface 32b1) of the reflector 30, and transmits through the extended end portion 43.

Since the light RayA from the first light source module 50A which reached the right edge 42d of the plate light-guiding unit 41 is diffused by the extended end portion 43 (and the knurl reflection surface 32b1) like this, the point lighting generated at the other edge portion (e.g. second fixing unit 45) of the first light guide 40A is suppressed.

When the light source 51 of the second light source module 50B is lit, the light from the light source 51 of the second light source module 50B (not illustrated) enters the bar light-guiding unit 42 through the upper end face 42c1 (entry surface) of the bar light-guiding unit 42 of the second light guide 40B, and is guided inside the second light guide 40B from the upper edge portion to the lower edge portion of the second light guide 40B while repeating the internal reflection (total reflection) inside the second light guide 40B. Then a part of the light is internally reflected (diffusion reflection) by the first structure LC1, and is emitted through the front face 42a of the bar light-guiding unit 42, and another part of the light is internally reflected (diffusion reflection) by the second structure LC2 and is emitted through the front face 41a of the plate light-guiding unit 41.

As described above, the light distribution pattern for the tail lamp is implemented by the light from the first light source module 50A, which is emitted through the front face 42a of the bar light-guiding unit 42 of the first light guide 40A and the front face 41a of the plate light-guiding unit 41 respectively, and the light from the second light source module 50B, which is emitted through the front face 42a of the bar light-guiding unit 42 of the second light guide 40B and the front face 41a of the plate light-guiding unit 41 respectively.

As mentioned above, when the light from the first light source module 50A emits through the front face 42a of the bar light-guiding unit 42 of the first light guide 40A, and the light from the second light source module 50B emits through the front face 42a of the bar light-guiding unit 42 of the second light guide 40B, the bar light-guiding unit 42 (first to third bar light-guiding units 42A to 42C) uniformly or approximately uniformly emits light (linear light emission).

In other words, the bar light-emitting region is formed. Further, when the light RayA from the first light source module 50A, which reached the right edge 42d of the plate light-guiding unit 41, emits through the extended end portion 43, the extended end portion 43 uniformly or approximately uniformly emits light (surface light emission).

Further, as mentioned above, when the light from the first light source module 50A emits light through the front face 41a of the plate light-guiding unit 41 of the first light guide 40A, and the light from the second light source module 50B emits through the front face 41a of the plate light-guiding unit 41 of the second light guide 40B, the plate light-guiding unit 41 (first to fifth plate light-guiding units 41A to 41E) uniformly or approximately uniformly emits light (surface light emission). In other words, the plate light-emitting region is formed.

The bar light-guiding unit 42 (bar light-emitting region) emits light relatively brighter than the plate light-guiding unit 41 (plate light-emitting region). This is because the optical axis of the light source 51 appropriately matches with the extending direction of the bar light-guiding unit 42, that is, light having a relatively strong intensity (e.g. light within a half-value angle) is guided inside the bar light-guiding unit 42, while light having a relatively weak intensity is guided inside the plate light-guiding unit 41.

For this reason, it is possible to realize a light emission appearance with extremely high designability in which the bar light-emitting region (linear light emission) appears in the plate light-emitting region (surface light emission).

As described above, according to this embodiment, a vehicular lamp fitting 10, which prevents nonuniformity of the spaces between the outer peripheral edges of the first and second light guides 40A and 40B and the opening edge 32a of the reflector 30 (lamp case) (see the spaces indicated by L1 to L5 in FIG. 2), and allows the bar light-guiding unit 42 and the plate light-guiding unit 41 to emit light uniformly (or approximately uniformly), can be provided.

This is because the outer peripheral edges of the first and second light guides 40A and 40B are not the bar light-guiding unit 42, but are the other edges 41Ad to 41Ed of the plate light-guiding unit 41, and the other edges 41Ad to 41Ed of the plate light-guiding unit 41 extend along the opening edge 32a of the reflector 30, as illustrated in FIG. 2.

According to this embodiment, the bar light-guiding unit 42, of which cross-sectional shape is approximately ginko leaf-shaped, is used, hence the bar light-guiding unit 42 can emit light more brightly compared with the case of using a standard bar light-guiding unit of which cross-sectional shape is circular (see FIG. 8).

According to this embodiment, the bottom reflection surface 31a, that emits light by reflecting light which is leaked backward from the first and second light guides 40A and 40B, is visually recognized behind the first and second light guides 40A and 40B that performs the surface light emission (plate light-guiding unit 41) and the linear light emission (bar light-guiding unit 42), hence a three-dimensional light-emitting appearance with a sense of depth can be implemented.

According to this embodiment, a new light-emitting appearance where the overlapped portion of the first light guide 40A and the second light guide 40B is relatively bright can be implemented. For example, in the case where the first light guide 40A and the second light guide 40B are overlapped in the front view, as illustrated in FIG. 2, the overlapped portion of the bar light-guiding units 42 is the brightest (see the portions indicated by C1 and C2 in FIG.

2), and the brightness decreases in the sequence of: the overlapped portion of the bar light-guiding unit 42 and the plate light-guiding unit 41 (see the portions indicated by C3 to C6 in FIG. 2); the overlapped portion of the plate light-guiding units 41 (see the portions indicated by C7 to C9 ion FIG. 2); and the portions other than C1 to C9. In other words, it is possible to realize a three-dimensional new light-emitting appearance with a sense of depth in which the brightness changes gradually.

According to this embodiment, the substrates 52A and 52B, on which the light sources 51 are mounted, can be fixed directly to the light guides 40A and 40B (see FIG. 4), hence compared with the case of fixing each light source 51 to the housing and the like, other than the light guides 40A and 40B, each light source 51 can be more accurately positioned with respect to the one end face 42c1 of the bar light-guiding unit 42.

According to this embodiment, the first light source module 50A is covered by the extended portion 33 of the reflector 30 (see FIG. 4A and FIG. 4B), hence it can be prevented that the first light source module 50A (first substrate 52A on which the light source 51 is mounted) is visually recognized from the front side.

Modifications will be described next.

In the above embodiments, an example of applying the vehicular lamp fitting of the present invention was described, but the present invention is not limited to this. For example, the vehicular lamp fitting of this invention may be applied to a stop lamp, a position lamp, a turn signal lamp, a reverse lamp or a day time running lamp (DRL).

In the case of the above embodiments, an example of using the reflector 30, which has a T-shaped opening edge 32a including a curved portion 32a1 on the front side, as the lamp case having the opening edge, was described, but the present invention is not limited to this. In other words, the lamp case is not limited to this, as long as the opening edge is included, and may be a lamp case which has an opening edge including only a curved portion 32a1, or a lamp case which has an opening edge including only a linear portion. The opening edge of the lamp case is not limited to the T-shaped opening edge 32a either, and may be an opening edge having a different shape.

In the above embodiments, an example of using the plate light-guiding units 41A and 41C as the first light guide 40A was described, but the present invention is not limited to this. For example, the first light guide 40A, which does not include at least one of the plate light-guiding units 41A and 41C, may be used. In the same manner, the second light guide 40B, which does not include at least one of the plate light-guiding units 41D and 41E, may be used.

In the above embodiments, an example of using the bottom reflection surface 31a was described, but the present invention is not limited to this. For example, the bottom reflection surface 31a may be omitted.

The numeric values used in the above embodiments are all examples, and needless to say, appropriate different numeric values can be used instead.

The above embodiments are merely examples in all aspects. The description on the above embodiments is not intended to limit the scope of the present invention. The present invention may be carried out in various other forms without departing from the spirit and major characteristics of the invention.

The invention claimed is:

1. A vehicular lamp fitting, comprising:
a lamp case having an opening edge;
a light guide that is disposed in the lamp case; and
a plurality of light guides,
a light source that emits light which is guided inside the light guide,
wherein the light guide includes a bar light-guiding unit and a plate light-guiding unit,
the bar light-guiding unit is a bar-shaped light-guiding unit that includes a front face disposed on the front side and a rear face disposed on the rear side, which is on the opposite side of the front side,
the plate light-guiding unit is a plate-shaped light-guiding unit that includes a front face disposed on the front side and a rear face disposed on the rear side, which is on the opposite side of the front side, and includes one edge connected to an outer peripheral surface of the bar light-guiding unit, and the other edge which is on the opposite side of the one edge,
the other edge of the plate light-guiding unit extends along the opening edge in the front view,
the rear face of the bar light-guiding unit includes a plurality of first structures configured to diffuse the light from the light source, which is guided inside the light guide, and allow the light to emit through the front face of the bar light-guiding unit,
the rear face of the plate light-guiding unit includes a plurality of second structures configured to diffuse the light from the light source, which is guided inside the light guide, and allow the light to emit through the front face of the plate light-guiding unit,
wherein the plurality of light guides include at least a first light guide and a second light guide, and the first light guide and the second light guide are disposed in a state of being at least partially overlapped in the front view, and
wherein the first light guide and the second light guide are disposed in a state where the bar light-guiding unit of the first light guide and the bar light-guiding unit of the second light guide are partially overlapped, the bar light-guiding unit of the first light guide and the plate light-guiding unit of the second light guide are partially overlapped, and the plate light-guiding unit of the first light guide and the plate light-guiding unit of the second light guide are partially overlapped in the front view.

2. The vehicular lamp fitting according to claim 1, wherein the front face of the bar light-guiding unit is a curved surface of which cross-sectional shape, when sectioned by a plane that is orthogonal to the longer direction of the bar light-guiding unit, is an arc which is convex toward the front side,
the rear face of the bar light-guiding unit includes a pair of side faces, of which the cross-sectional shape, when sectioned by a plane that is orthogonal to the longer direction of the bar light-guiding unit, is a pair of arcs, which are convex toward the inside of the bar light-guiding unit and of which space decreases as approaching the rear side, and a hindmost face that connects the pair of side faces, so that the cross-sectional shape, when sectioned by a plane that is orthogonal to the longer direction of the bar light-guiding unit, becomes a line connecting the edges of the pair of arcs, and the hindmost face includes the first structure.

3. The vehicular lamp fitting according to claim 1, further comprising a reflection surface, wherein
the reflection surface is disposed on the rear side of the light guide so as to face the rear face of the light guide.

4. The vehicular lamp fitting according to claim 1, wherein the reflection surface is disposed on the bottom portion of the lamp case.

5. The vehicular lamp fitting according to claim 1,
wherein the light guide includes a first bar light-guiding unit, a second bar light-guiding unit, a first plate light-guiding unit and a second plate light-guiding unit,
the first bar light-guiding unit and the second bar light-guiding unit are bar-shaped light-guiding units each of which includes a front face disposed on the front side and a rear face disposed on the rear side, which is on the opposite side of the front side, and are disposed in parallel via a space,
the first plate light-guiding unit is a plate-shaped light-guiding unit which includes a front face disposed on the front side and a rear face disposed on the rear side, which is on the opposite side of the front side, and includes one edge connected to an outer peripheral surface of the first bar lighting-guiding unit, and the other edge disposed on the opposite side of the one edge,
the other edge of the first plate light-guiding unit extends along the opening edge in the front view,
the second plate light-guiding unit is a plate-shaped light-guiding unit which includes a front face disposed on the front side and a rear face disposed on the rear side, which is on the opposite side of the front side, and includes one edge connected to an outer peripheral surface of the first bar light-guiding unit, and the other edge connected to an outer peripheral surface of the second bar light-guiding unit,
each of the rear faces of the first and second bar light-guiding units includes a plurality of first structures configured to diffuse the light from the light source, which is guided inside the light source, and allow the light to emit through each of the front faces of the first and second bar light-guiding units respectively, and
each of the rear faces of the first and second plate light-guiding units includes a plurality of second structures configured to diffuse the light from the light source, which is guided inside the light guide, and allow the light to emit through each of the front faces of the first and second plate light-guiding units respectively.

6. The vehicular lamp fitting according to claim 1,
wherein the opening edge is an opening edge that surrounds a first space which extends in a first direction, and a second space which extends in a second direction which crosses the first direction,
the first light guide is disposed in a first space in a state where the bar light-guiding unit of the first light guide extends in the first direction, and
the second light guide is disposed in the second space in a state where the bar light-guiding unit of the second light guide extends in the second direction.

7. The vehicular lamp fitting according to claim 6,
wherein the opening edge is a T-shaped opening edge that surrounds the first space and the second space.

8. The vehicular lamp fitting according to claim 1,
further comprising a substrate on which the light source is mounted,
wherein the light guide further comprises a fixing unit to which the substrate is fixed, and
the substrate is fixed to the fixing unit in a state where the light source faces one end face of the bar light-guiding unit.

9. The vehicular lamp fitting according to claim 8, wherein the lamp case further comprises an extended portion which extends backward from the opening edge in a state of maintaining a space from the lamp case, and
the substrate is disposed in the space between the lamp case and the extended portion.

* * * * *